(12) United States Patent
Oh et al.

(10) Patent No.: US 10,532,899 B2
(45) Date of Patent: Jan. 14, 2020

(54) APPARATUS FOR LOADING AND UNLOADING LNG TANK CONTAINER

(71) Applicant: KOREA GAS CORPORATION, Daegu (KR)

(72) Inventors: Young Sam Oh, Incheon (KR); Kyoung Shik Choi, Ansan-si (KR); Ki Dong Kim, Incheon (KR)

(73) Assignee: Korea Gas Corporation, Daegu (KR)

( * ) Notice: Subject to any disclaimer, the term of this patent is extended or adjusted under 35 U.S.C. 154(b) by 47 days.

(21) Appl. No.: 15/747,074

(22) PCT Filed: May 31, 2016

(86) PCT No.: PCT/KR2016/005772
§ 371 (c)(1),
(2) Date: Jan. 23, 2018

(87) PCT Pub. No.: WO2017/014422
PCT Pub. Date: Jan. 26, 2017

(65) Prior Publication Data
US 2018/0370743 A1    Dec. 27, 2018

(30) Foreign Application Priority Data
Jul. 23, 2015    (KR) .......................... 10-2015-0104180

(51) Int. Cl.
B65G 67/46    (2006.01)
B65G 67/20    (2006.01)
(Continued)

(52) U.S. Cl.
CPC ............ *B65G 67/46* (2013.01); *B60P 1/6445* (2013.01); *B65G 63/004* (2013.01); *B65G 67/20* (2013.01);
(Continued)

(58) Field of Classification Search
CPC ........ B65G 67/46; B65G 67/02; B65G 67/04; B65G 67/20; B65G 67/24; B60P 1/6445; B66F 7/08; B66F 7/20; B66C 19/007
See application file for complete search history.

(56) References Cited

U.S. PATENT DOCUMENTS 1,870,991 A * 8/1932 Fitch .................... B66C 19/007
                                                    254/47
3,146,903 A * 9/1964 Bjorklund ............. B66C 19/007
                                                    414/460
(Continued)

FOREIGN PATENT DOCUMENTS

CN    1152542 A    6/1997
CN    2765714 Y    3/2006
(Continued)

OTHER PUBLICATIONS

International Search Report dated Oct. 6, 2016 of PCT/KR2016/005772 which is the parent application and its English translation—4 pages.
(Continued)

*Primary Examiner* — Kaitlin S Joerger
(74) *Attorney, Agent, or Firm* — Knobbe Martens Olson & Bear LLP

(57) ABSTRACT

The present invention relates to an apparatus for loading and unloading an LNG tank container, the apparatus comprising: a base provided at a place at which LNG is used; a transfer cart capable of moving back and forth with respect to the base; a clamping device provided at a head part of the transfer cart; and a clamp position adjusting device capable of adjusting a horizontal position of the clamping device. Since there is no transfer of the LNG between tanks, the amount of LNG loss is reduced and the risk for the occurrence of a fire accident is reduced.

11 Claims, 13 Drawing Sheets

(51) Int. Cl.
*B60P 1/64* (2006.01)
*B65G 63/00* (2006.01)
*B66F 7/08* (2006.01)

(52) U.S. Cl.
CPC ........ *B66F 7/08* (2013.01); *B65G 2201/0235* (2013.01)

(56) References Cited

U.S. PATENT DOCUMENTS

| | | | | |
|---|---|---|---|---|
| 3,260,385 | A * | 7/1966 | King | B61D 47/005 414/395 |
| 3,474,924 | A * | 10/1969 | Wheeler | B60P 1/6427 414/458 |
| 3,602,375 | A * | 8/1971 | Martinson | B60P 1/6445 212/198 |
| 4,915,576 | A | 4/1990 | Lanigan, Jr. et al. | |
| 5,114,295 | A * | 5/1992 | Jansson | B66C 19/007 212/326 |
| 6,071,062 | A * | 6/2000 | Warhurst | B60P 1/6445 414/347 |
| 6,155,770 | A * | 12/2000 | Warhurst | B60P 1/6445 414/347 |
| 6,364,601 | B1 * | 4/2002 | Picarello | B66C 1/28 294/81.1 |
| 7,070,060 | B1 * | 7/2006 | Feider | B66C 13/54 212/291 |
| 7,322,786 | B1 * | 1/2008 | Rivera | B65G 63/025 414/140.3 |
| 7,811,044 | B2 * | 10/2010 | Warhurst | B60P 1/6445 414/458 |
| 2002/0001515 | A1 * | 1/2002 | Lukumaa | B66C 19/007 414/460 |
| 2002/0015637 | A1 * | 2/2002 | Franzen | B66C 1/663 414/458 |
| 2007/0110550 | A1 * | 5/2007 | Callens | B66C 19/007 414/460 |
| 2008/0121444 | A1 * | 5/2008 | Bauer | B60K 3/04 180/65.1 |
| 2008/0206027 | A1 * | 8/2008 | Manzi | B66C 19/007 414/349 |
| 2014/0017046 | A1 * | 1/2014 | Wieschemann | B66C 13/12 414/460 |
| 2016/0053944 | A1 * | 2/2016 | Oh | F17C 7/02 62/50.2 |
| 2016/0178127 | A1 * | 6/2016 | Oh | B60S 5/02 141/1 |
| 2016/0332848 | A1 * | 11/2016 | Wieschemann | B66C 19/007 |
| 2017/0015531 | A1 * | 1/2017 | Schults | B66C 9/12 |
| 2017/0015532 | A1 * | 1/2017 | Ojapalo | B66C 19/007 |

FOREIGN PATENT DOCUMENTS

| | | | | |
|---|---|---|---|---|
| CN | 203237948 U | | 10/2013 | |
| DE | 102014100833 B3 | * | 3/2015 | ........... B66C 19/007 |
| JP | 2003-20124 A | | 1/2003 | |
| KR | 10-2007-0051688 A | | 5/2007 | |
| KR | 10-2008-0011201 A | | 1/2008 | |
| KR | 10-2009-0022324 A | | 3/2009 | |
| KR | 20-2014-0001755 U | | 3/2014 | |
| KR | 10-1402381 B1 | | 6/2014 | |
| WO | 2015/012445 A1 | | 1/2015 | |
| WO | WO-2015110539 A1 | * | 7/2015 | ........... B66C 19/007 |

OTHER PUBLICATIONS

Office Action of corresponding Chinese Patent Application No. 201680043141.9—8 pages (dated Feb. 3, 2019).

Extended European Search Report of corresponding Patent Application No. 16827926.3—7 pages (dated Feb. 13, 2019.

* cited by examiner

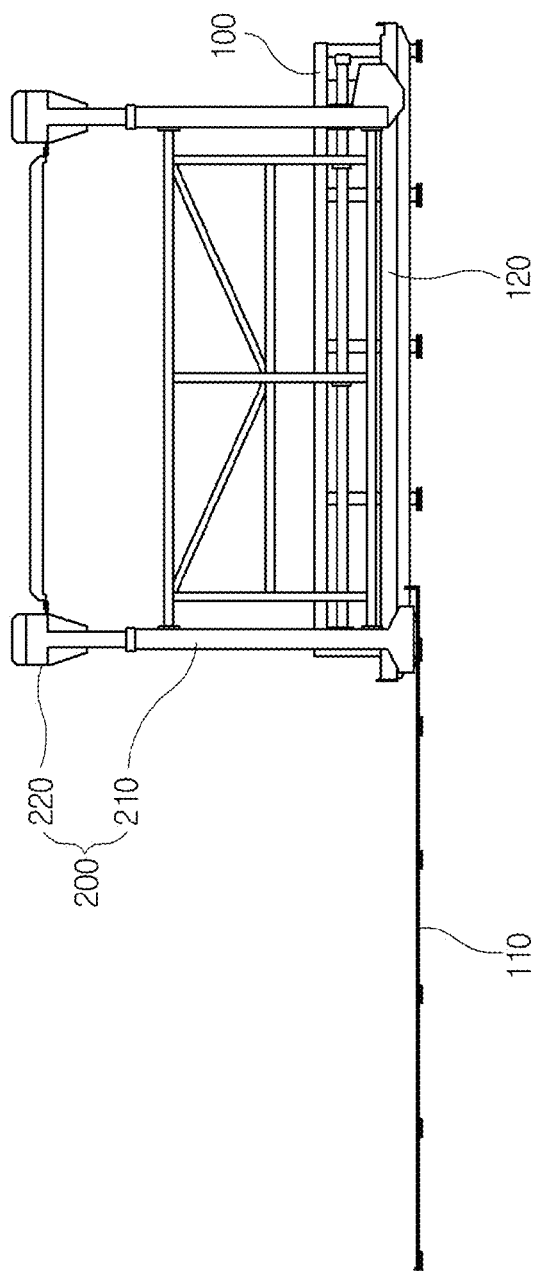

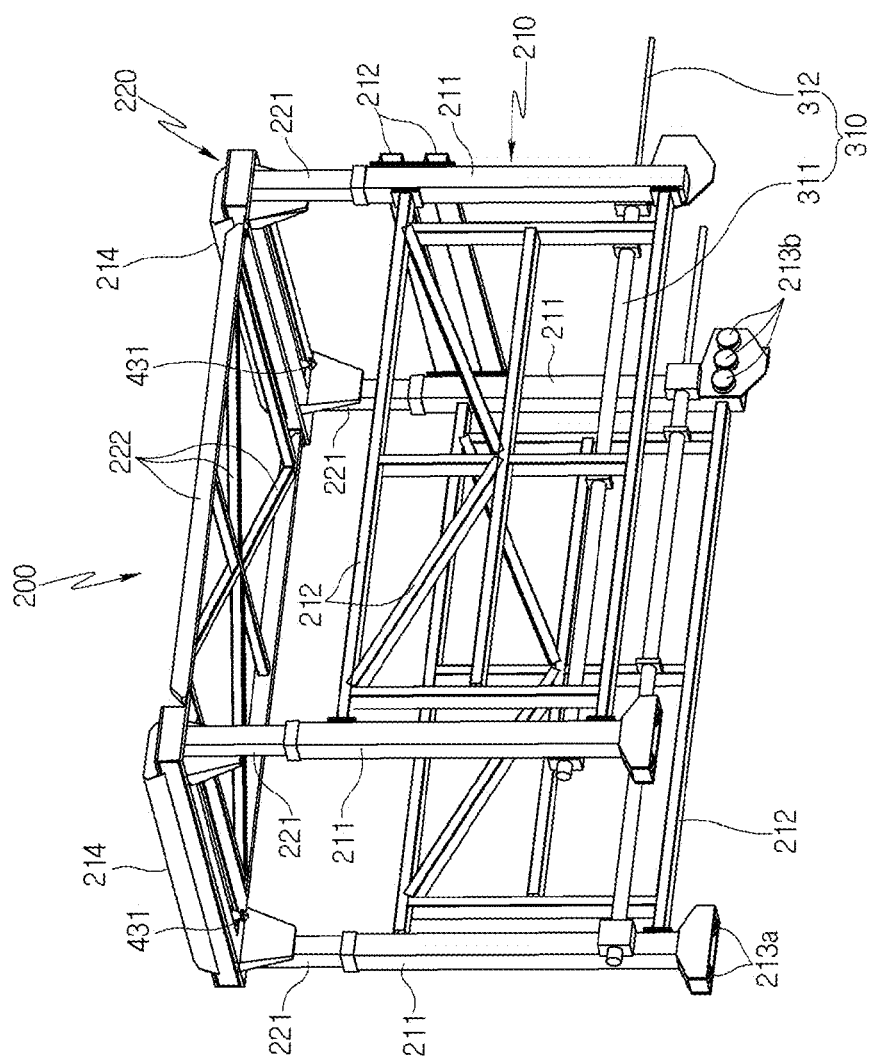

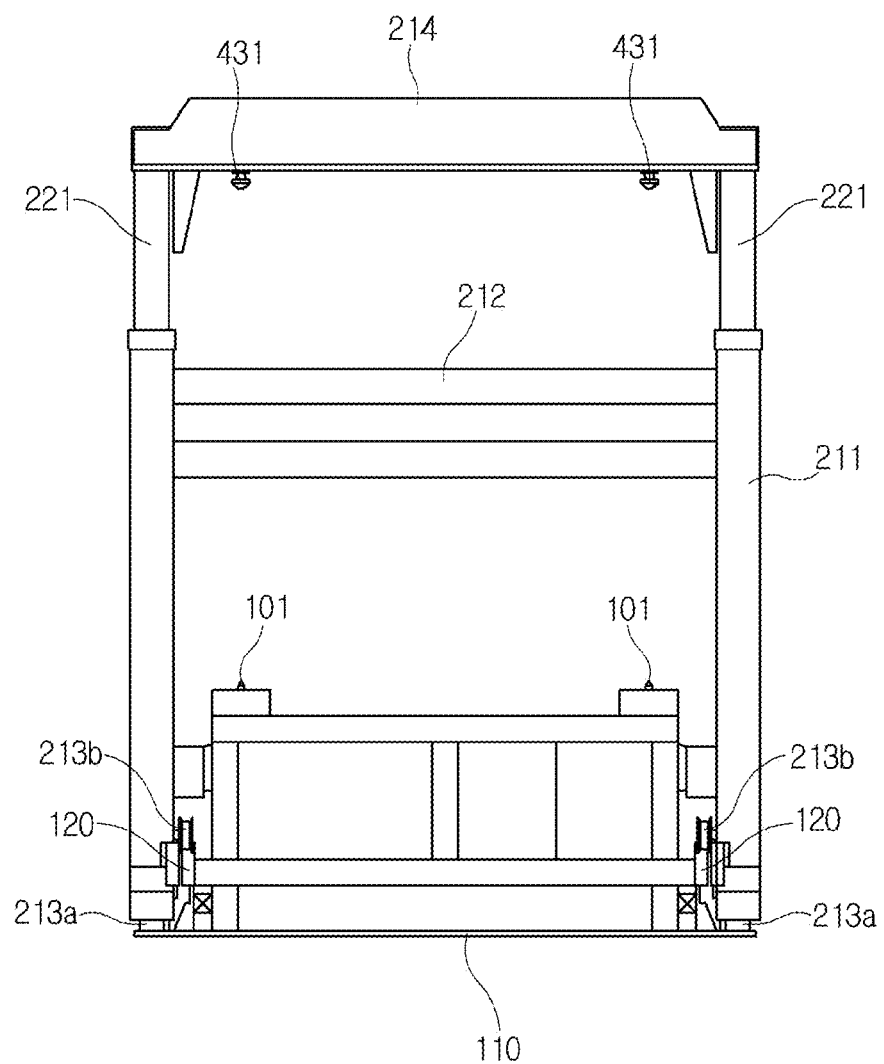
[FIG. 3]

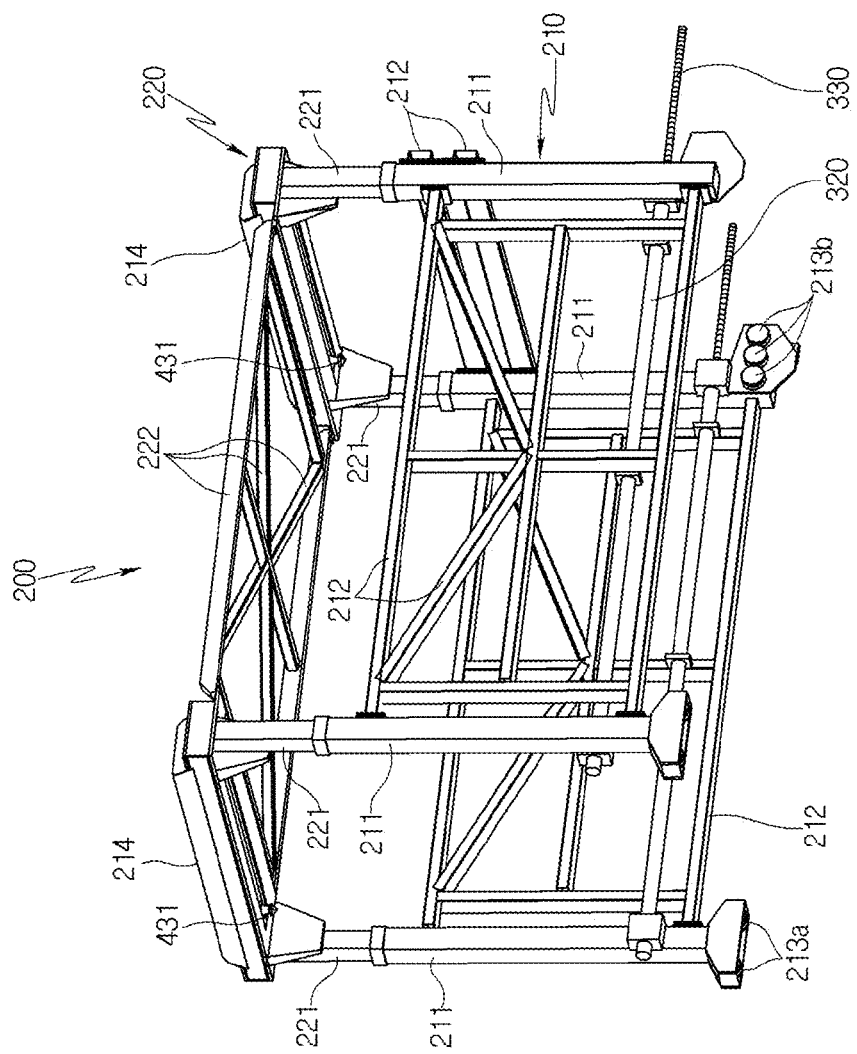
[FIG. 4]

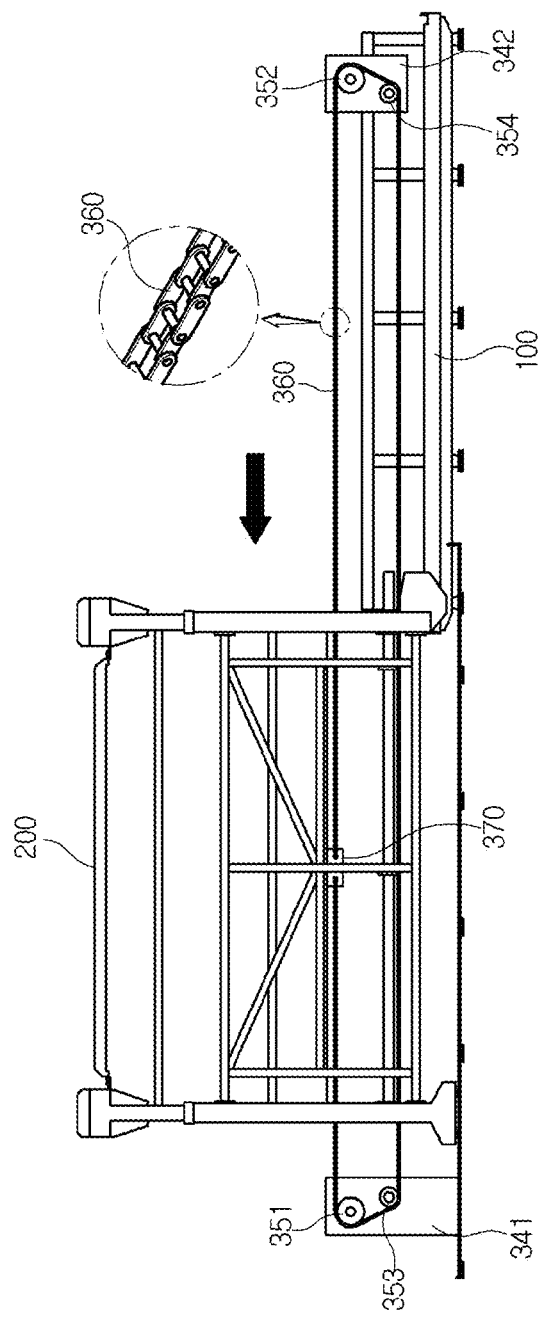
[FIG. 5]

[FIG. 6]
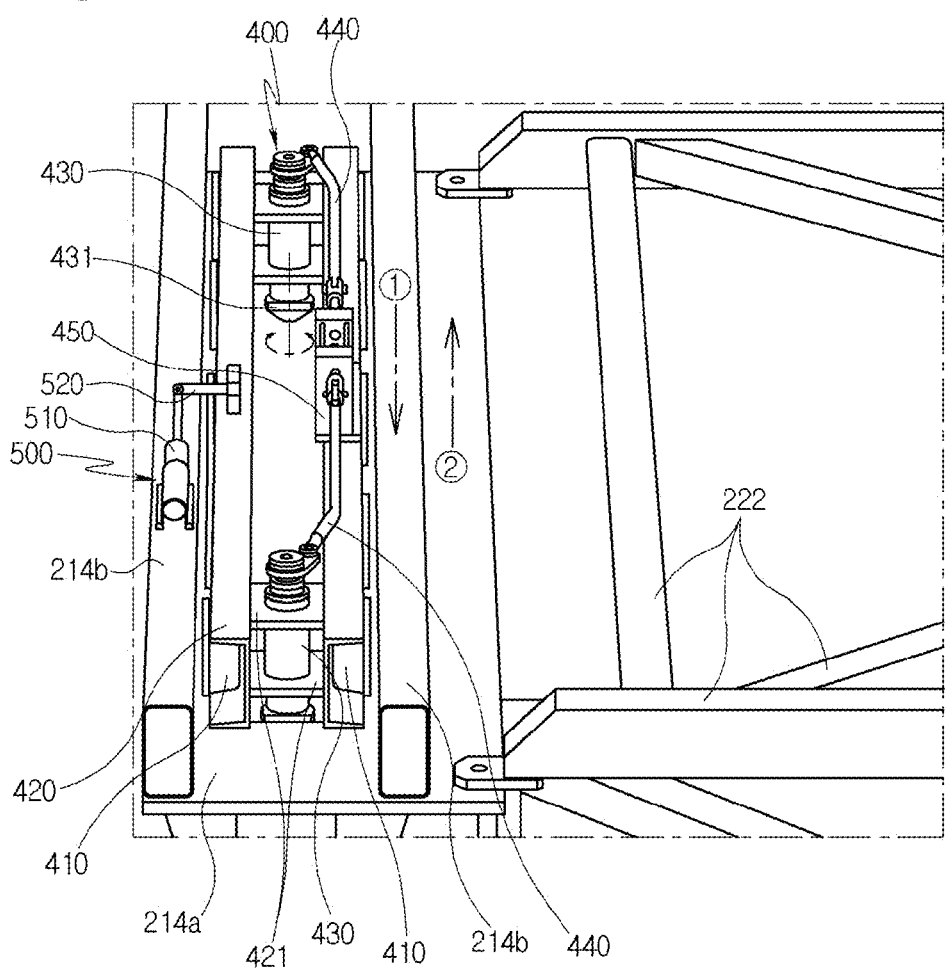

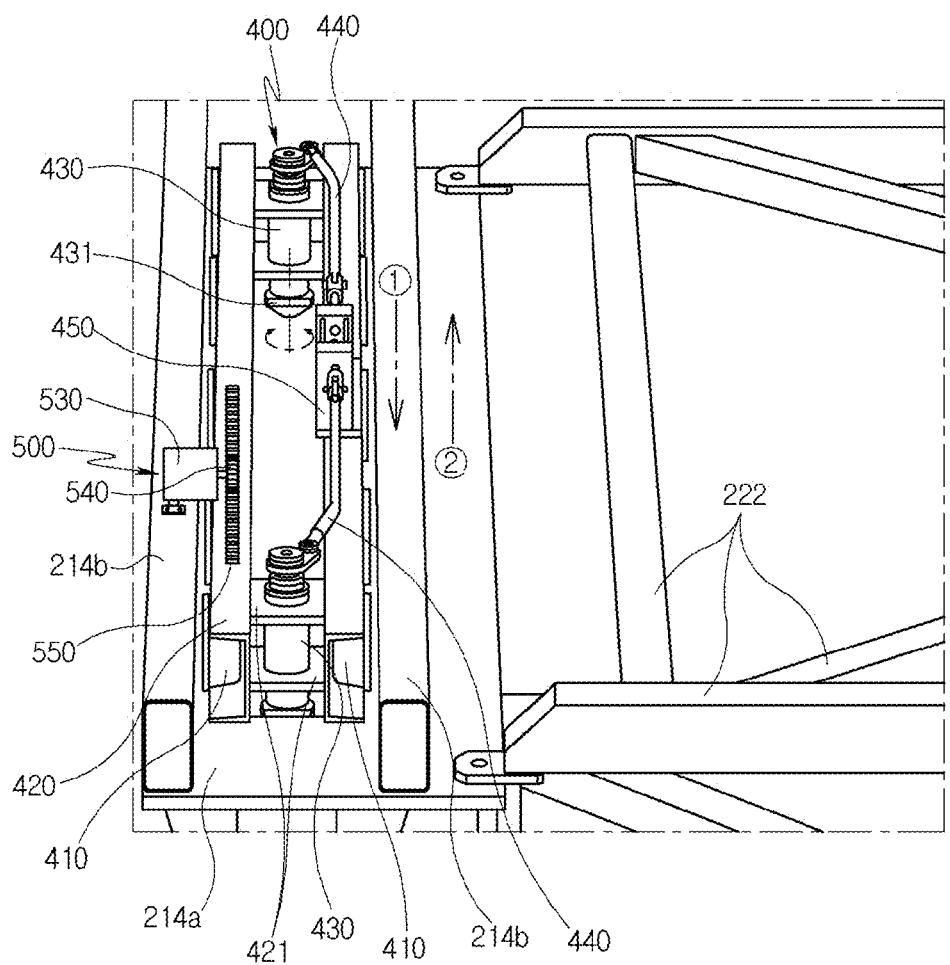
[FIG. 7]

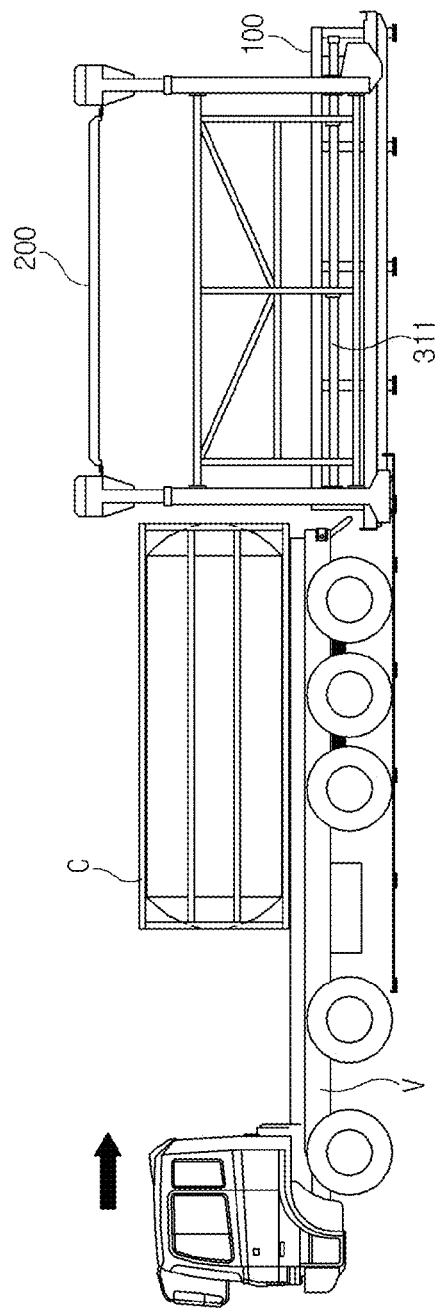

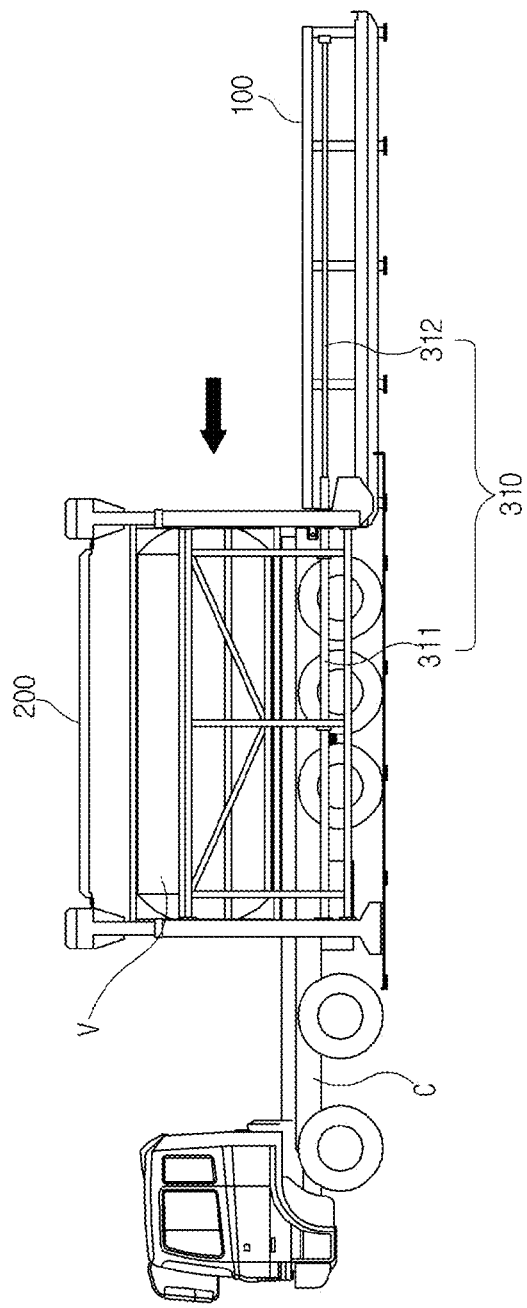
[FIG. 9]

[FIG. 10]
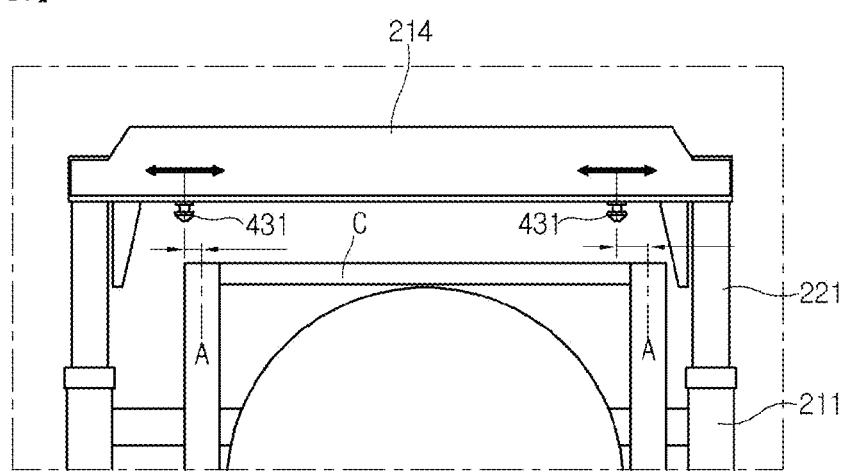

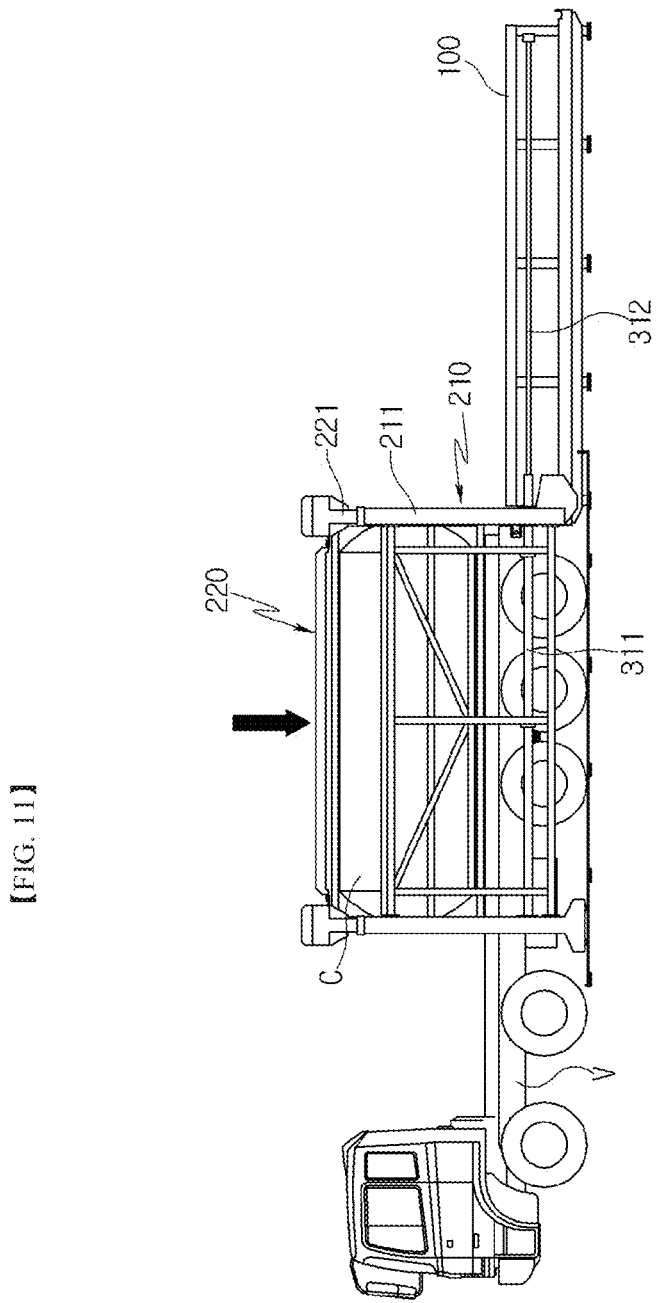
[FIG. 11]

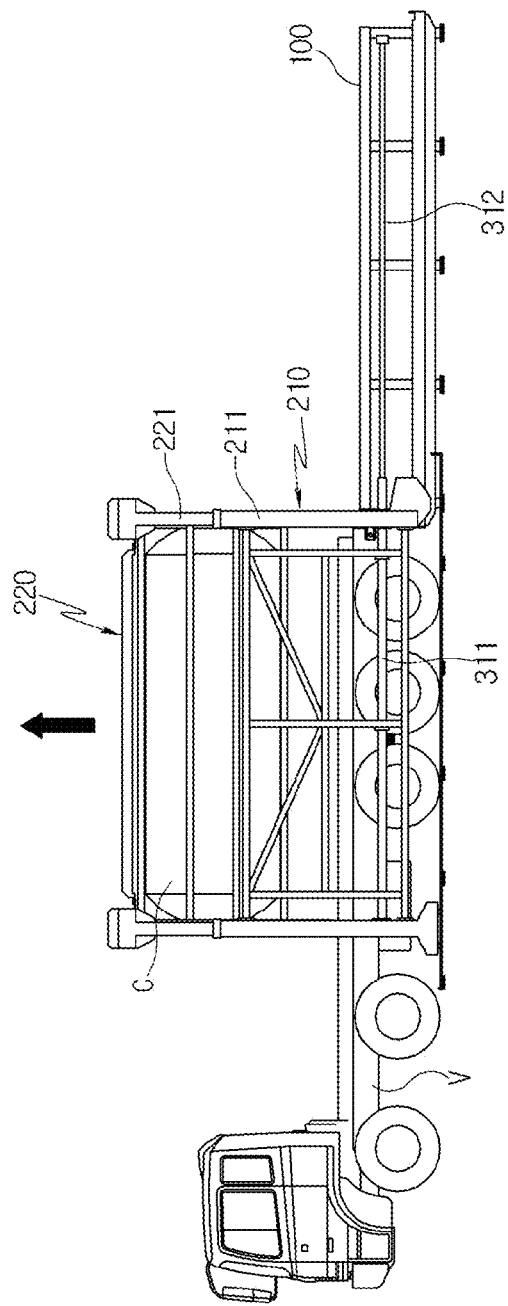
[FIG. 12]

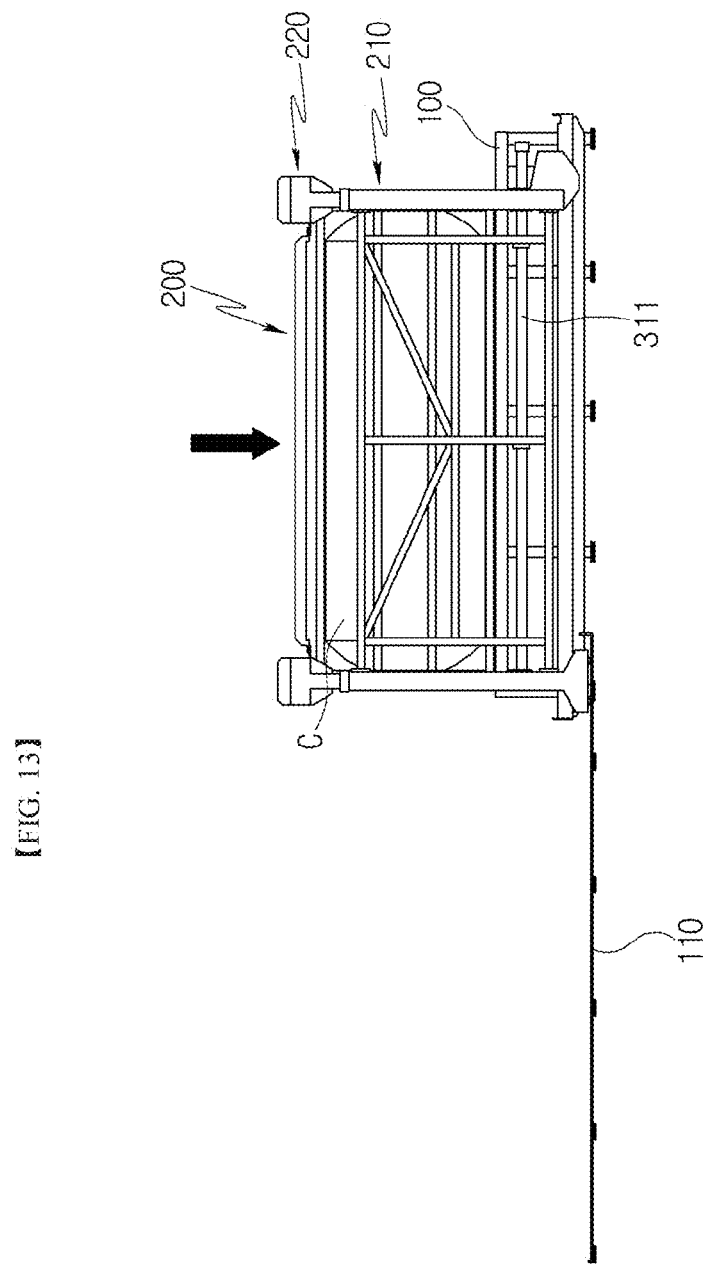

APPARATUS FOR LOADING AND UNLOADING LNG TANK CONTAINER

TECHNICAL FIELD

The present invention relates to an apparatus for loading and unloading an LNG tank container, and, more particularly to an apparatus for loading and unloading an LNG tank container which unloads an LNG tank container from a transport vehicle onto a base disposed at a place of use or loads the LNG tank container from the base onto the transport vehicle.

BACKGROUND ART

LNG stored in a storage tank at an LNG receiving terminal is vaporized through a vaporization facility and then supplied to places of use across the country through a pipeline network.

For an area where a pipe network is not installed, LNG is transported directly to a stationary storage tank disposed in that area using a tanker truck.

However, this method has problems in that it takes a long time to supply LNG from the tanker truck to the stationary storage tank and boil-off gas needs to be discharged to the air during filling of the tank, causing loss of LNG and a risk of fire.

Therefore, there is a need for a simple and safe LNG supply method in which LNG is transported directly by a transport vehicle, but it is not necessary to supply LNG from the vehicle to a stationary storage tank at a place of use.

DISCLOSURE

Technical Problem

Embodiments of the present invention have been conceived to solve such a problem in the art and provide an apparatus for loading and unloading an LNG tank container, which can unload a container-type LNG tank (hereinafter, "LNG tank container") transported to a place of use by a container transport vehicle onto a base (i.e., a stationary structure supporting the LNG tank container) provided at the place of use or can load an empty LNG tank container from the base onto the transport vehicle.

Technical Solution

In accordance with an aspect of the present invention, an apparatus for loading and unloading an LNG tank container includes: a base securely disposed on the ground; a transfer cart movable forward/backward between a location in front of the base and the base, the transfer cart including a lower cart movable along a guide rail and a liftable unit disposed on the lower cart to be moved up and down; a cart transfer unit disposed between the base and the transfer cart to move the transfer cart forward/backward; and a clamping unit disposed at each of front and rear head portions of the liftable unit to clamp and unclamp the LNG tank container, the clamping unit being disposed on a clamp mounting frame movable laterally inside each of the head portions.

Columns of the liftable unit may be inserted into corresponding columns of the lower cart to be movable up and down, and each of the columns of the lower cart may be provided therein with a hydraulic cylinder supporting the columns of the liftable unit.

The guide rail may include: a guide rail disposed on the ground in front of the base to support and guide wheels disposed under front right and left columns of the lower cart; and a guide rail disposed on both side surfaces of the base to be spaced apart from the ground and supporting and guiding wheels disposed under rear right and left columns of the lower cart.

The cart transfer unit may include: a hydraulic cylinder disposed between the lower cart of the transfer cart and the base; and a hydraulic pump supplying and discharging hydraulic fluid to and from the hydraulic cylinder.

The cart transfer unit may include: a nut screw mounted on the lower cart of the transfer cart; a lead screw inserted at one end thereof into the nut screw to be screwed to the nut screw and rotatably mounted at the other end thereof on the base; and a motor disposed in the base to rotate the lead screw.

The cart transfer unit may include: sprocket mounts disposed inside a front end of the guide rail disposed on the ground and at a rear end of the base, respectively; sprockets disposed on the sprocket mounts, respectively; a chain engaged with the sprockets and connected at both ends thereof to a fixing member mounted on the lower cart of the transfer cart; and a motor rotating one of the sprockets.

The clamping unit may include: clamps vertically disposed at both sides of the clamp mounting frame; a reciprocating hydraulic cylinder disposed at a middle portion of the clamp mounting frame; and links connecting both ends of a piston rod of the reciprocating hydraulic cylinder to pivot arms provided at upper ends of pivoting axes of the clamps, respectively.

A lower end of each of the clamps may protrude downward from the head portion through a hole formed through a bottom plate of the head portion, and the pivoting axis of each of the clamps may be provided at a lower end thereof with a coupling head configured to be inserted into a coupling hole formed at an upper edge of the LNG tank container and pivoted to clamp the LNG tank container.

The head portion may be provided with a clamp position adjustment unit moving the clamp mounting frame laterally.

The clamp position adjustment unit may include: a hydraulic cylinder mounted on a head frame of the head portion; and a fixing bar mounted on the clamp mounting frame, the fixing bar being connected to a piston rod of the hydraulic cylinder.

The clamp position adjustment unit may include: a motor mounted on a head frame of the head portion; a pinion gear mounted on a shaft of the motor; and a rack gear mounted on the clamp mounting frame to be engaged with the pinion gear.

The clamp mounting frame may have concave insertion portions formed on front and rear surfaces thereof, and a plurality of wheels may be disposed on each of side surfaces of front and rear head frames corresponding to the insertion portions to be inserted into the insertion portion to support an upper surface of the insertion portion such that the clamp mounting frame is laterally movably supported by the wheels.

Advantageous Effects

According to the present invention, it is not necessary to supply LNG transported by a vehicle from the vehicle to a stationary storage tank at a place of use, making it easier to replenish LNG at the place of use.

In addition, since it is not necessary to supply LNG at the place of use, boil-off gas does not need to be discharged to the air, thereby reducing a loss of LNG while preventing a risk of fire.

Further, even when a transport vehicle does not stop at a correct position, the LNG tank container can be accurately clamped by adjusting a lateral position of the clamp, whereby unloading of the LNG tank container can be performed more quickly and easily.

Moreover, the LNG tank container loading/unloading apparatus according to the present invention may also be used for loading/unloading of not only LNG tank container but also a variety of cargo containers between a transport vehicle and the base disposed on the ground.

DESCRIPTION OF DRAWINGS

FIG. 1 is a side view of an LNG tank container loading/unloading apparatus according to the present invention.

FIG. 2 is a perspective view of a transfer cart which is a main component of the apparatus according to the present invention (wherein a hydraulic cylinder is used as a cart transfer unit).

FIG. 3 is a right side view of the apparatus of FIG. 1.

FIG. 4 is a view of an embodiment in which a lead screw and a nut screw are used as the cart transfer unit.

FIG. 5 is a view of an embodiment in which a chain is used as the cart transfer unit.

FIG. 6 is a perspective view of a head portion of the transfer cart (with a head cover removed), showing installation of a clamping unit and a clamp position adjustment unit.

FIG. 7 is a view of a clamp position adjustment unit according to another embodiment.

FIG. 8 is a view showing entry of a vehicle loaded with an LNG tank container.

FIG. 9 is a view of the transfer cart which is moved forward.

FIG. 10 is a view of a clamp which is not adjusted in position.

FIG. 11 is a view of a liftable unit which is moved downward.

FIG. 12 is a view of the liftable unit which is moved upward after the LNG tank container is clamped.

FIG. 13 is a view of the liftable unit which is moved downward after the transfer cart is returned.

BEST MODE

Embodiments of the present invention will be described in detail with reference to the accompanying drawings. It should be understood that the present invention may be embodied in different ways and is not limited to the following embodiments. In addition, it should be understood that various modifications, changes, alterations, and equivalent embodiments can be made by those skilled in the art without departing from the spirit and scope of the invention. Further, it should be noted that the drawings are not to precise scale and may be exaggerated in thickness of lines or size of components for descriptive convenience and clarity only.

In addition, terms to be described later are terms defined in consideration of functions of the present invention, and these may vary with the intention or practice of a user or an operator. Therefore, such terms should be defined based on the entire content disclosed herein.

Hereinafter, exemplary embodiments of the present invention will be described in detail with reference to the accompanying drawings. Although loading/unloading of an LNG tank container is used as an example, it should be understood that the present invention may be used to unload/load a variety of general cargo container from/to a container vehicle.

Referring to FIGS. 1 to 3, an apparatus for loading and unloading an LNG tank container according to the present invention includes: a base 100 securely disposed on the ground to be loaded with the LNG tank container; a transfer cart 200 movable forward/backward between the base 100 and the front of the base 100; a cart transfer unit disposed between the base 100 and the transfer cart 200 to transfer the transfer cart 200; and a clamping unit disposed at front and rear head portions of the transfer cart 200 to clamp the LNG tank container.

The base 100 is a generally cuboid frame and has a flat upper surface to allow the LNG tank container to be placed thereon. In addition, the base 100 is assembled with vertical and horizontal steel pipes and angles and is secured to the ground to stably support the heavy load of the LNG tank container.

The base 100 has insertion protrusions 101 (see FIG. 3) formed at four corners of the upper surface thereof to be inserted into seating grooves formed at four corners of a lower surface of the LNG tank container, respectively. When the LNG tank container is placed on the upper surface of the base 100, the insertion protrusions 101 are inserted into the seating grooves of the LNG tank container, respectively, whereby the LNG tank container can be accurately positioned and stably held in place.

The transfer cart 200 includes a lower cart 210 movable forward/backward (i.e., in a lateral direction in FIG. 1) and a liftable unit 220 disposed on the lower cart 210 to be movable up and down.

As shown in FIG. 2, the lower cart 210 includes upright columns 211 formed at four corners thereof, respectively, and a plurality of connection frames 212 connecting the columns 211 to one another to satisfy required rigidity and maintain the shape of the lower cart. However, the lower cart 210 does not include a connection frame 212 between the front right and left columns 211 to prevent collision with the LNG tank container on a vehicle when the lower cart is moved toward the vehicle.

The liftable unit 220 also includes four columns 221 corresponding to the columns 211 of the lower cart. The columns 221 of the liftable unit are connected to one another by a plurality of connection frames 222 in a designed shape to maintain structural rigidity.

The columns 221 of the liftable unit 220 are inserted into the corresponding columns 211 of the lower cart 210 to be operated in a telescopic manner. Each of the columns 211 of the lower cart 210 is provided therein with a hydraulic cylinder supporting a corresponding one of the columns 221 of the liftable unit 220. Thus, the liftable unit 220 is moved up or down depending on hydraulic conditions of the hydraulic cylinder. In other words, when hydraulic pressure is supplied to the hydraulic cylinder to force a piston rod to protrude, the liftable unit 220 is moved upward, whereas, when the hydraulic pressure is relieved to force the piston rod to retract, the liftable unit 220 is moved downward.

The transfer cart 200 is sized to surround the upper portion and both sides of the LNG tank container when the LNG tank container is placed on the base 100.

As shown in FIGS. 2 and 3, each of the four columns 211 of the lower cart 210 is provided at a lower end thereof with a plurality of wheels 213a or 213b. Corresponding to these, guide rails 110, 120 are disposed at both sides of the ground in front of the base 100 and at both lower side portions of a body of the base 100, respectively.

The guide rail 110 disposed on the ground in front of the base 100 serves to support and guide the wheels 213*a* of both front columns 211 of the lower cart 210, and the guide rail 120 disposed at both lower side portions of the base 100 serves to support the wheels 213*b* of both rear columns 211 of the lower cart.

Unlike the front guide rail 110 disposed on the ground, the rear guide rail 120 is separated by a predetermined distance from the ground. As a result, the rear columns are shorter than the front columns.

The cart transfer unit is disposed between the base 100 and the transfer cart 200 to move the transfer cart 200 forward/backward.

The cart transfer unit may be configured in a variety of ways. Firstly, the cart transfer unit may be composed of a hydraulic cylinder 310, as shown in FIG. 2. A cylinder body 311 of the hydraulic cylinder 310 is mounted inside both sides of the lower cart 210 of the transfer cart 200. An end of a piston rod 312 protruding from the cylinder body 311 is secured to a rear end of the base 100 (see FIG. 9).

A hydraulic pump (not shown) capable of supplying hydraulic pressure is connected to the cylinder body 311 of the hydraulic cylinder 310 via a hose. Here, it should be understood that the operation of the hydraulic pump may be controlled by operating a button switch of a separate control panel. Thus, the transfer cart 200 can be moved forward/backward by controlling the supply/discharge of hydraulic fluid to/from the cylinder body 311 through control of the operation of the hydraulic pump such that the piston rod 312 is forced to protrude from or retract into the cylinder body 311. In other words, when the piston rod 312 is forced to protrude, the transfer cart 200 is moved forward, whereas, when the piston rod 312 is forced to retract, the transfer cart 200 is moved backward.

Here, the hydraulic cylinder 310 may be disposed in such a way that the cylinder body 311 is secured to the transfer cart 200 and the piston rod 312 is secured to the base 100, as described above, or that the cylinder body 311 is secured to the base 100 and the piston rod 312 is secured to the transfer cart 200.

Referring to FIG. 4, the cart transfer unit may be composed of a nut screw 320 and a lead screw 330. The nut screw 320 is a long tubular member having a feed screw formed on an inner circumferential surface thereof, and the lead screw 330 is a long rod-like member having a feed screw formed on an outer circumferential surface thereof. The lead screw 330 is inserted into the nut screw 320 to be screwed to the nut screw.

The nut screw 320 is secured to the lower cart 210 of the transfer cart 200 not to be rotated or moved back and forth, and one end of the lead screw 330 (i.e., an end of the lead screw opposite the end inserted into the nut screw 320) is rotatably mounted at a rear end of the base 100. The base 100 is provided with a motor (not shown) to rotate the lead screw 330 in a forward/reverse direction. The lead screw 330 is connected to a shaft of the motor via a gear.

Thus, the lower cart 210 with the nut screw 320 mounted thereon, i.e., the transfer cart 200 can be moved forward/backward by rotating the lead screw 330 in the forward/reverse direction through rotation of the motor such that the nut screw 320 is moved forward/backward with respect to the lead screw 330 with a fixed position by the screw action of the nut screw 320 and the lead screw 330.

Referring to FIG. 5, the cart transfer unit may be composed of sprockets 351, 352, 353, 354 and a chain 360. Sprocket mounts 341, 342 are disposed inside a front end of the guide rail 110 disposed on the ground and at the rear end of the base 100 to allow the sprockets 351, 352, 353, 354 to be mounted thereon, respectively.

Although each of the sprocket mounts 341, 342 may have only at least one main sprocket 351 or 352 mounted thereon, it is preferable to install auxiliary sprockets 353, 354 below the main sprockets 351, 352, respectively, in order to smoothly drive the chain 360 and maintain a proper tension.

The chain 360 is engaged with the sprockets 351, 352, 353, 354 and is connected at both ends thereof to a fixing member 370 mounted on the lower cart 210. In addition, a chain drive motor (not shown) is connected to one of the main sprockets 351, 352. The chain drive motor may be disposed on the sprocket mounts 341 or 342.

In this way, the rotation direction of the chain 360 can be adjusted by controlling the rotation direction of the chain drive motor, such that the lower cart 210 connected to the chain 360, that is, the transfer cart 200 can be moved forward/backward.

Referring to FIG. 6, the clamping unit 400 for clamping the LNG tank container and a clamp position adjustment unit 500 for adjusting the lateral position of the clamping unit 400 are disposed inside each of the head portions 214 at the front and rear upper ends of the liftable unit 220.

The clamping unit 400 includes clamps 430 disposed at both sides of a clamp mounting frame 420 (as viewed from the front, that is, the left side of FIG. 6), respectively, links 440 connected to the clamps 430, respectively, and a hydraulic cylinder 450 which includes a piston rod protruding from both sides thereof and connected to the links 440 and is mounted at a middle portion of the clamp mounting frame 420.

The hydraulic cylinder 450 is a reciprocating cylinder which includes one piston rod disposed through a cylinder body and a piston disposed inside the cylinder body. Thus, the piston rod is moved right or left depending on hydraulic conditions in spaces at both sides of the piston in the cylinder body, such that the links 440 connected to both ends of the piston rod are simultaneously moved in the same direction to operate both of the clamps 430 in the same direction.

Each of the clamps 430 includes a pivoting axis passing through a cylindrical body, a pivoting arm disposed at an upper end of the pivoting axis and hinged to one end of the link 440, and a coupling head 431 mounted at a lower end of the pivoting axis and composed of a flat rectangular plate and a rectangular pyramid protruding from the bottom of the rectangular plate. Thus, when the hydraulic cylinder 450 is operated, the pivoting arm is pivoted via the link 440, such that the pivoting axis connected to the pivoting arm is pivoted in the same direction, whereby the coupling head 431 at the lower end of the pivoting axis is pivoted in the same direction. The stroke of the piston rod of the hydraulic cylinder 450 is set to a length allowing the coupling head 431 to be pivoted by 90°. Thus, the coupling head 431 can be pivoted by 90° in a forward/reverse direction by controlling the direction of operation of the hydraulic cylinder 450.

The clamp position adjustment unit 500 includes: a pair of head frames 214*b* extending in a lateral direction and securely disposed on a bottom plate 214*a* of the head portion 214 to be separated by a predetermined distance from each other in a forward and backward direction; a plurality of wheels 410 rotatably disposed on each of side surfaces of the front and rear head frames 214*b* facing each other; the clamp mounting frame 420 supported by the wheels 410 to be movable in the lateral direction; a hydraulic cylinder 510 mounted on an upper surface of one of the head frames 214*b* in a longitudinal direction of the head frame 214*b*; and a fixing bar 520 mounted on an upper surface of the clamp mounting frame 420 to be situated at one end thereof above the head frame 214*b* on which the hydraulic cylinder 510 is mounted, wherein an end of a piston rod of the hydraulic cylinder 510 is connected to the one end of the fixing bar 520.

Thus, a lateral position of the clamp mounting frame 420 (as viewed from the front) can be adjusted via the fixing bar 520 by controlling the operation direction and operation amount of the piston rod of the hydraulic cylinder 510, whereby a position of the clamp 430, that is, a clamping position can be adjusted.

Referring to FIG. 7, the clamp position adjustment unit 500 may be driven using a motor 530, a pinion gear 540, and a rack gear 550. Here, the motor 530 is mounted on an upper surface of one of head frames 214*b*; the pinion gear 540 is mounted on a shaft of the motor 530; and the rack gear 550 is mounted on an upper surface of the clamp mounting frame 420 to be engaged with the pinion gear 540.

Thus, the position of the clamp 430 can be adjusted by controlling the rotation direction and rotation amount of the motor 530 to control the direction and amount of lateral movement of the clamp mounting frame 420.

The head frames 214*b* comprises a pair of head frames separated by a predetermined distance from each other in the forward and backward direction, and a plurality of wheels 410 are disposed on each of surfaces of the front and rear head frames 214*b* facing each other. The clamp mounting frame 420 is disposed between the front and rear head frames 214*b*, and the wheels 410 are inserted into both concave insertion portions of the clamp mounting frame 420 to support the clamp mounting frame 420.

The clamp mounting frame 420 includes the concave insertion portions formed on front and rear surfaces thereof to be supported by the wheels 410. The insertion portions are formed by arranging steel bars each having a "U" shape in cross-section with back surfaces thereof facing each other. The front steel bar is connected at both sides to the rear steel bar through upper and lower connection plates 421, and both of the clamps 430 vertically pass through the connection plates 421.

The bottom plate 214*a* of the head portion 214 is formed therethrough with a long rectangular hole in the lateral direction, such that a lower end of the clamp 430 protrudes downward from the head portion 214 through the hole. In addition, the hole serves to allow the lower end of the clamp 430 to be free from interference when the clamp mounting frame 420 is moved. As a result, the clamp 430 can be freely moved in the lateral direction.

A driving source of the cart transfer unit (that is, the hydraulic cylinder and the motor), the hydraulic cylinder moving the liftable unit 220 upward/downward, a driving source of the clamping unit 400 (that is, the hydraulic cylinder 450), and a driving source of the clamp position adjustment unit 500 (that is, the hydraulic cylinder 510 and the motor 530) may be automatically controlled by an electronic control unit (not shown) or manually controlled using a manually operated switch of a separate control panel (not shown).

Since control of movement locations of each component can be easily achieved using a limit switch or various position detection sensors, description thereof will be omitted.

Now, a process of unloading an LNG tank container from a transport vehicle onto the base 100 disposed at a place of use using the LNG tank container loading/unloading apparatus according to the present invention will be described. In FIGS. 8, 9, and 11 to 13, only the hydraulic cylinder 310 is used as the cart transfer unit. For the two other embodiments (wherein the nut screw and the lead screw are used as the cart transfer unit or the chain and the sprockets are used as the cart transfer unit), since the forward/backward movement of the transfer cart 200 can be easily understood based on the above description of the operation of the aforementioned components, illustration of these embodiments will be omitted. In addition, since a process of loading an empty LNG tank container from the base onto the transport vehicle is performed in the reverse order of the unloading process, description thereof will be omitted.

Referring to FIG. 8, the transfer cart 200 is located at the side of the base 100 to surround the base 100 in a standby state. First, a vehicle V carrying an LNG tank container C is reversed to approach the front of the base 100. Here, the vehicle V enters between the guide rails 110 on both sides.

Once the vehicle V is stopped, the transfer cart 200 is moved forward to a position surrounding the LNG tank container C, as shown in FIG. 9. Forward/backward movement of the transfer cart 200 with respect to the base 100 is accomplished by operation of the cart transfer unit, which is the hydraulic cylinder 310 herein. When a hydraulic fluid is supplied to the cylinder body 311 to force the piston rod 312 to protrude, the cylinder body 311 and thus the transfer cart 200 is moved forward with respect to the piston rod 312.

Then, the clamping unit 400 is moved laterally such that the coupling head 431 of the clamp 430 is positioned to match a coupling hole (lying on line A, not shown) formed at an upper edge of the LNG tank container C, as shown in FIG. 10.

This operation is accomplished by controlling the operation direction and operation amount of the hydraulic cylinder 510 of the clamp position adjustment unit 500 or by controlling the rotation direction and rotation amount of the motor 530 to move the clamp mounting frame 420 in a lateral direction (directions of arrows ① and ②).

As described above, position control can be achieved by detecting the location of the coupling hole of the LNG tank container C using a position sensor and controlling the operation of the hydraulic cylinder 510 or the motor 530 based on the detected location.

Once the coupling head 431 is positioned to match the coupling hole, the liftable unit 220 is moved downward, as shown in FIG. 11. Here, downward movement of the liftable unit is achieved by relieving hydraulic pressure from a hydraulic cylinder contained in the column 211 of the lower cart 210. When the hydraulic pressure is relieved, the column 221 of the liftable unit 220 is inserted into the column 211 of the lower cart 210, whereby the liftable unit 220 is moved downward.

When the liftable unit 220 is moved downward, the coupling head 431 of the clamp 430 is moved downward along with the liftable unit 220 to be inserted into the coupling hole of the LNG tank container C. After completion of downward movement of the liftable unit 220, the reciprocating hydraulic cylinder 450 is operated in one direction such that the link 440 is linearly moved to pivot the pivoting arm at the upper end of the clamp 430, whereby the coupling head 431 is pivoted by 90°.

Each of the coupling head 431 and the coupling hole of the LNG tank container C has a rectangular shape with a pair of long sides and a pair of short sides. When the coupling head 431 is positioned to have the same phase as the coupling hole, the coupling head 431 can be inserted into or released from the coupling hole. When the coupling head 431 is pivoted by 90° after being inserted into the coupling hole, the coupling head and the coupling hole have intersecting phases, such that an upper surface of the coupling head 431 is caught by a periphery of the coupling hole, making it impossible to separate the coupling head from the coupling hole. In other words, after the liftable unit 220 is moved downward such that the coupling head 431 is inserted into the coupling hole of the LNG tank container C, the coupling head 431 is pivoted by 90° to be engaged with the coupling hole, whereby the LNG tank container C is clamped.

Then, when the column 221 of the liftable unit 220 is forced to protrude upward from the column 211 of the lower cart 210 by supplying hydraulic pressure to the hydraulic cylinder inside the lower cart 210, the liftable unit 220 is moved upward with respect to the lower cart 210, as shown in FIG. 12. At this time, the LNG tank container C clamped by the clamping unit 400 disposed at the liftable unit 220 is moved upward together with the liftable unit 220.

After the transfer cart 200 with the LNG tank container C lifted up is reversed to be returned to the original position thereof, as shown in FIG. 13, the liftable unit 220 is moved downward again such that the LNG tank container C is placed on the base 100. Here, the LNG tank container C can be positioned on the base 100 by adjusting a lateral position of the LNG tank container C using the clamp position adjustment unit 500.

Once the LNG tank container C is placed on the base 100, the reciprocating hydraulic cylinder 450 is operated in a reverse direction to pivot the coupling head 431 to the original position thereof (such that the coupling head 431 has the same phase as the coupling hole of the LNG tank container C), and then the liftable unit 220 is moved upward to be in a standby state.

Then, the LNG tank container C is connected to a supply facility provided at the place of use, such that LNG can be taken out from the LNG tank container C through the supply facility.

After LNG is fully taken out from the LNG tank container C, the empty LNG tank container C is loaded from the base 100 onto the transport vehicle V in the reverse order of the unloading process.

In the above process, since the wheels 213a, 213b of the transfer cart 200 are guided by the guide rails 110, 120 when the transfer cart 200 is moved forward/backward, the forward/backward movement of the transfer cart 200 can be performed accurately and stably.

According to the present invention, since, after the LNG tank container C is transported from an LNG receiving terminal to a place of use, the LNG tank container C is unloaded directly onto the base 100 at the place of use and then LNG is taken out from the LNG tank container C, it is not necessary to supply LNG from a vehicle to a stationary storage tank disposed at the place of use after transporting the LNG to the place of use using the vehicle.

Thus, it is not necessary to discharge BOG into the air during transfer of LNG, thereby reducing both loss of LNG and a risk of fire.

In addition, it is not necessary to install a stationary storage tank at the place of use, thereby saving related costs.

Further, in the LNG tank container loading/unloading apparatus according to the present invention, a position of the clamp can be accurately adjusted by the clamp position adjustment unit such that the clamp can match the coupling hole of the LNG tank container even when a lateral position of a transport vehicle approaching the front of the apparatus is not correct, whereby the LNG tank container can be clamped without any problem. In other words, it is not necessary to precisely control the position of the vehicle in a backward state, thereby reducing the time required for loading/unloading the LNG tank container.

The clamp position adjustment unit may also be used to accurately the position of the LNG tank container with respect to the base after moving the clamped LNG tank container from the vehicle onto the base.

Moreover, the LNG tank container loading/unloading apparatus according to the present invention may also be used for loading/unloading a box-type general cargo container between a transport vehicle and the base.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

The invention claimed is:

1. An apparatus for loading and unloading an LNG tank container, comprising:
   a base securely disposed on the ground;
   a transfer cart movable forward/backward between a location in front of the base and the base, the transfer cart comprising a lower cart movable along a guide rail and a liftable unit disposed on the lower cart to be moved up and down;
   a cart transfer unit disposed between the base and the transfer cart to move the transfer cart forward/backward; and
   a clamping unit disposed at each of front and rear head portions of the liftable unit to clamp and unclamp the LNG tank container, the clamping unit being disposed on a clamp mounting frame movable laterally inside each of the head portions,
   wherein the guide rail comprises: a guide rail disposed on the ground in front of the base to support and guide wheels disposed under front right and left columns of the lower cart; and a guide rail disposed on both side surfaces of the base to be spaced apart from the ground and supporting and guiding wheels disposed under rear right and left columns of the lower cart.

2. The apparatus according to claim 1, wherein columns of the liftable unit are inserted into corresponding columns of the lower cart to be movable up and down, and each of the columns of the lower cart are provided therein with a hydraulic cylinder supporting the columns of the liftable unit.

3. The apparatus according to claim 1, wherein the cart transfer unit comprises: a hydraulic cylinder disposed between the lower cart of the transfer cart and the base; and a hydraulic pump supplying and discharging hydraulic fluid to and from the hydraulic cylinder.

4. The apparatus according to claim 1, wherein the cart transfer unit comprises: a nut screw mounted on the lower cart of the transfer cart; a lead screw inserted at one end thereof into the nut screw to be screwed to the nut screw and rotatably mounted at the other end thereof on the base; and a motor disposed in the base to rotate the lead screw.

5. The apparatus according to claim 1, wherein the cart transfer unit comprises: sprocket mounts disposed inside a front end of the guide rail disposed on the ground and at a rear end of the base, respectively; sprockets disposed on the sprocket mounts, respectively; a chain engaged with the sprockets and connected at both ends thereof to a fixing member mounted on the lower cart of the transfer cart; and a motor rotating one of the sprockets.

6. The apparatus according to claim 1, wherein the clamping unit comprises: clamps vertically disposed at both sides of the clamp mounting frame; a reciprocating hydraulic cylinder disposed at a middle portion of the clamp mounting frame; and links connecting both ends of a piston rod of the reciprocating hydraulic cylinder to pivoting arms provided at upper ends of pivoting axes of the clamps, respectively.

7. The apparatus according to claim 6, wherein a lower end of each of the clamps protrudes downward from the head portion through a hole formed through a bottom plate of the head portion, and the pivoting axis of each of the clamps is provided at a lower end thereof with a coupling head configured to be inserted into a coupling hole formed at an upper edge of the LNG tank container and pivoted to clamp the LNG tank container.

8. The apparatus according to claim 1, wherein the head portion is provided with a clamp position adjustment unit moving the clamp mounting frame laterally.

9. The apparatus according to claim 8, wherein the clamp position adjustment unit comprises: a hydraulic cylinder mounted on a head frame of the head portion; and a fixing bar mounted on the clamp mounting frame, the fixing bar being connected to a piston rod of the hydraulic cylinder.

10. The apparatus according to claim 8, wherein the clamp position adjustment unit comprises: a motor mounted on a head frame of the head portion; a pinion gear mounted on a shaft of the motor; and a rack gear mounted on the clamp mounting frame to be engaged with the pinion gear.

11. The apparatus according to claim 8, wherein the clamp mounting frame has concave insertion portions formed on front and rear surfaces thereof, and a plurality of wheels is disposed on each of side surfaces of front and rear head frames corresponding to the insertion portions to be inserted into the insertion portion to support an upper surface of the insertion portion such that the clamp mounting frame is laterally movably supported by the wheels.

* * * * *